(12) United States Patent
Futatsugi et al.

(10) Patent No.: US 6,171,122 B1
(45) Date of Patent: Jan. 9, 2001

(54) CARD CONNECTOR

(75) Inventors: Takashi Futatsugi, Tokyo; Hidenori Muramatsu, Kanagawa; Katsumi Yamaguchi, Saitama, all of (JP)

(73) Assignee: The Whitaker Corporation, Wilmington, DE (US)

( * ) Notice: Under 35 U.S.C. 154(b), the term of this patent shall be extended for 0 days.

(21) Appl. No.: 09/330,466

(22) Filed: Jun. 11, 1999

(30) Foreign Application Priority Data

Jun. 12, 1998 (JP) .................................................. 10-164643

(51) Int. Cl.⁷ ...................................................... H01R 13/62
(52) U.S. Cl. .............................................. 439/159; 439/160
(58) Field of Search ..................................... 439/159, 160, 439/67, 74

(56) References Cited

U.S. PATENT DOCUMENTS 4,894,015 * 1/1990 Stockero et al. ........................ 439/67
5,967,812 * 10/1999 Tung et al. ............................ 439/159

FOREIGN PATENT DOCUMENTS

| 0 664 519 A2 | 7/1995 | (EP) . |
| 2 330 701 | 4/1999 | (GB) . |
| WO 97/10691 | 3/1997 | (WO) . |

OTHER PUBLICATIONS

Japanese UM Publication No. 6–37947, May 20, 1994.
Search Report under Section 17, Application No. GB 99135443.6, Date of Search Jan. 7, 2000.

* cited by examiner

Primary Examiner—Brian Sircus
Assistant Examiner—Son V. Nguyen

(57) ABSTRACT

A compact card connector is equipped with an efficient stop means for an ejection member and that affords easy mounting of the ejection member which serves as a card-ejecting means. The card connector has an ejection member (90) that is capable of pivoting within a connector (21) in order to eject a card. The pivoting of the ejection member (90) is stopped by a supporting member (50) that is fixedly mounted to the connector (21). Supporting members (50, 50a), along with a plate member (40), constitutes a support means for an FPC (30).

6 Claims, 3 Drawing Sheets

CARD CONNECTOR

FIELD OF THE INVENTION

The present invention relates to a card connector, and more particularly to a card connector equipped with a pivoting ejection member as ejecting means for ejecting a card.

BACKGROUND OF THE INVENTION

An example of a conventional card connector is disclosed in Japanese Utility Model Publication No. 6-37947. The disclosed card connector includes an ejector mechanism for ejecting a card. The ejector mechanism has an ejection member pivotably located within a housing such that it will eject the card from a card-receiving recess, and a lever member for applying an action force thereto. Part of a lateral edge of the ejection member engages part of an inner surface of the housing that constitutes an ejection member holding space, thereby constituting a pivot fulcrum of the ejection member. The pivot range of the ejection member is defined by the shape of the holding space. Specifically, part of the housing constitutes a stop means for stopping the pivoting of the ejection member.

However, the card connector disclosed in the above publication has two drawbacks. The first is that because the stop means for stopping the pivoting of the ejection member is integrally provided by the housing of an electrical connector, there is no flexibility involved in mounting the ejection member to the housing, thereby making the operation more difficult. The second drawback is that because the stop means is located at a position near the pivot fulcrum and away from the action component of the force for pivoting the ejection member, a large moment of force is applied to the housing in the course of stopping the ejection member; and, as a result, the housing has to have relatively thick walls so that it can stop the ejection member against such force, so the connector housing ends up being relatively large.

An object of the present invention is therefore to provide a compact card connector that is equipped with an efficient stop means for an ejection member and that affords easy mounting of the ejection member to a housing, which serves as a card-ejecting means.

SUMMARY OF THE INVENTION

The present invention is directed to a card connector equipped with a connector unit for holding a card, and an ejector mechanism for ejecting the card, the ejector mechanism includes an ejection member that pivots so as to eject the card, and a pivot fulcrum of the ejection member being positioned adjacent a lateral edge of the ejection member, wherein a supporting member is mounted on the connector unit and includes stop means for stopping movement of the ejection member.

The supporting member also includes support means for supporting a flexible printed circuit of the connector unit.

The supporting member has mounting means for mounting the supporting member on a housing of the connector unit.

The connector unit is capable of holding two cards in a height direction, a pair of ejection members being provided corresponding thereto, and the stop means of the supporting member extends in the height direction so as to be able to stop both of the ejection members.

A card connector having a connector unit for holding a card, comprises a connector housing having electrical contacts secured therein for electrical connection to the card when inserted into the connector unit; an ejector mechanism having an ejection member pivotally mounted onto the connector housing for pivotal movement relative thereto between a card-insertion position and a card-ejection position; and a supporting member mounted onto the connector housing including stop means against which the ejection member engages thereby limiting forward movement of the ejection member.

BRIEF DESCRIPTION OF THE DRAWINGS

An embodiment of the present invention will now be described by way of example with reference to the accompanying drawings in which:

FIGS. 1a–1c are views of a card connector pertaining to the present invention, wherein FIG. 1a is a front view, FIG. 1b is a side view, and FIG. 1c is a bottom view.

FIGS. 2a–2c are views of a supporting member, wherein FIG. 2a is a top plan view, FIG. 2b is a side view, and FIG. 2c is a front view.

FIGS. 3a and 3b are enlarged views of a front end of the connector, wherein FIG. 3a is a part top plan view and FIG. 3b is a part side view as seen in the direction of arrow B in FIG. 3a.

DETAILED DESCRIPTION OF THE INVENTION

Figure 1A:
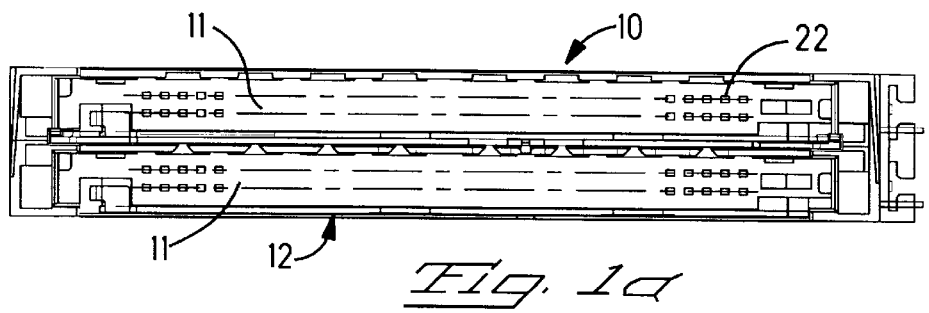
Figure 1B:
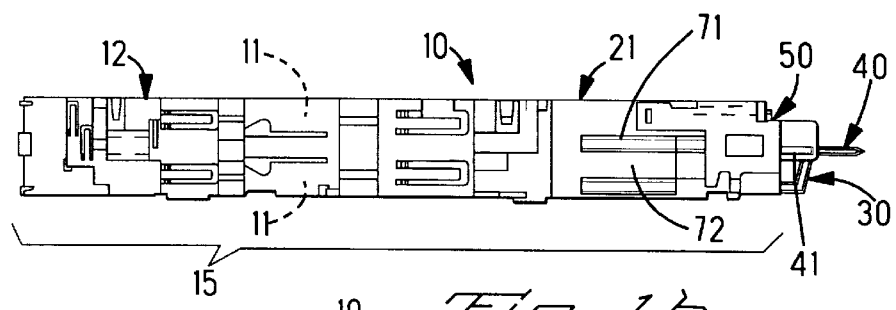
Figure 1C:
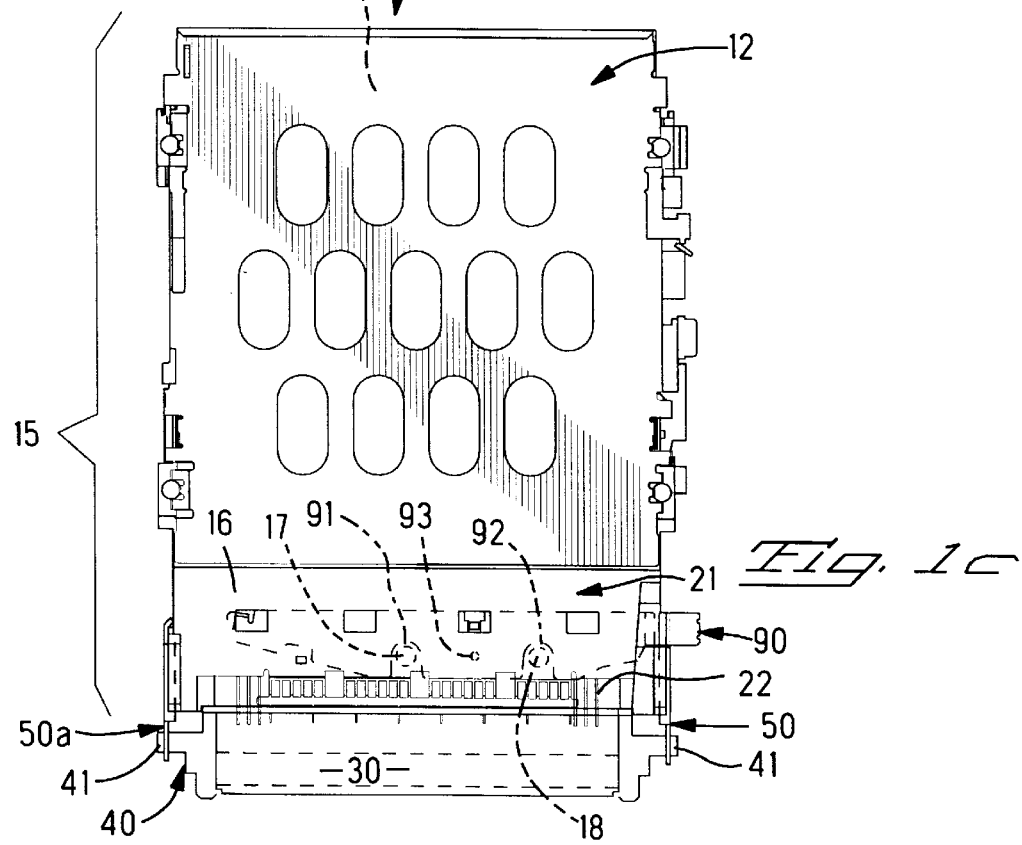

As shown in FIG. 1, a card connector 10 shown as a preferred embodiment is equipped with a pair of cardholding members 11 capable of holding cards in a height direction. Each of the card-holding members 11 is defined by a frame 12 located relatively forward.

Electrical terminals of the cards are electrically connected to a plurality of electrical contacts 22 of an electrical connector 21 located adjacent an inner end of the card connector 10. The contacts 22 are electrically connected to an FPC (flexible printed circuit) 30 located at the inner end of connector unit 15, which comprises the frame 12 and the connector 21.

Figure 3A:
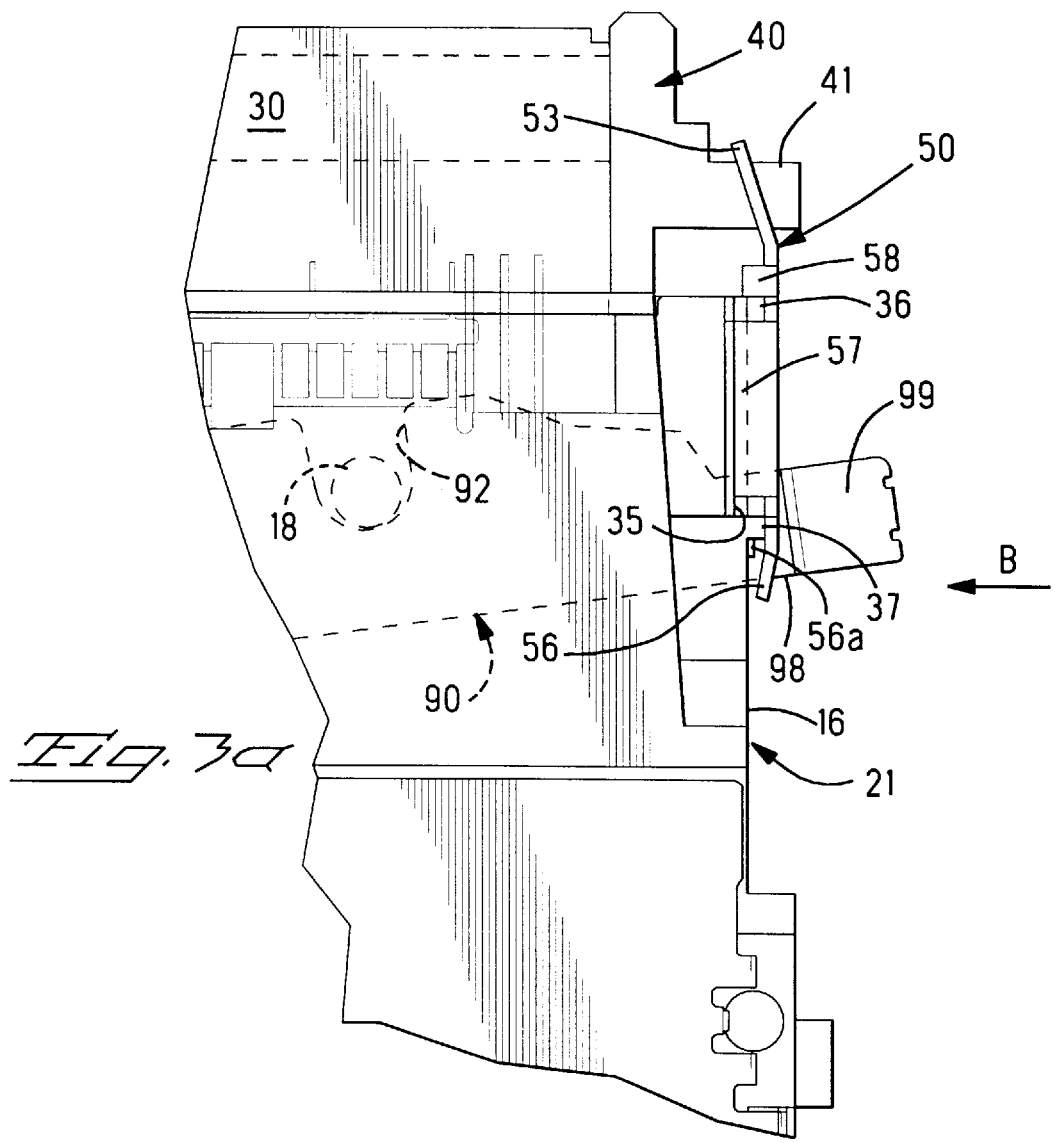

As shown in FIGS. 1 and 3, the FPC 30 is supported with respect to the connector unit 15 by the cooperative action of a metal plate member 40 positioned so as to be sandwiched by a folded FPC 30, and metal supporting members 50 that support projections 41 at both ends of the plate member 40 and that are mounted to the connector 21.

An ejection member 90, which is able to eject a card by pivoting, is further disposed in a dielectric housing 16 of the connector 21 of the connector unit 15.

The ejection member 90 is located at a specific position of the connector 21, and it is kept from coming loose by engagement of a protrusion 93 with part of the connector 21. A pair of ejection members 90 is provided corresponding to the pair of card-holding members 11. A pair of recesses 91, 92 is located along an inner lateral edge of the ejection members 90. When the ejection members 90 are mounted to the connector 21, posts 17, 18, which are integrally provided by housing 16 are disposed within the recesses 91, 92, respectively. In the early stage of card ejection, a lateral edge of the recess 91 engages with the post 17, constituting a pivot fulcrum or pivot center at this location, and, in the middle of the pivot operation, a lateral edge of the recess 92 and the post 18 engage with each other, and the pivot fulcrum moves to the contact location between the recess 92 and the post 18.

Figure 2A:
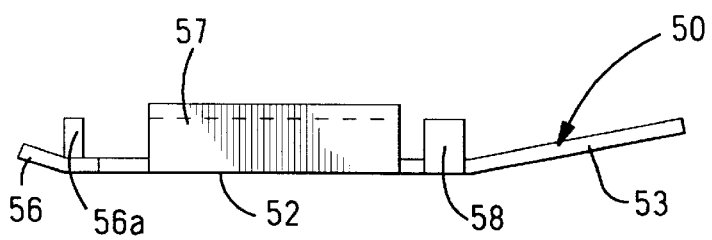
Figure 2B:
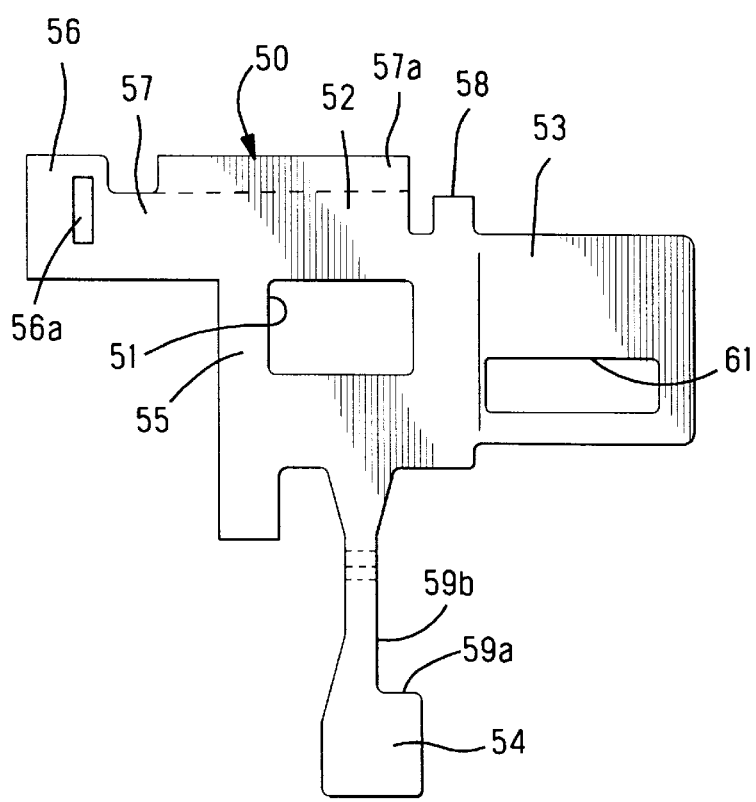
Figure 2C:
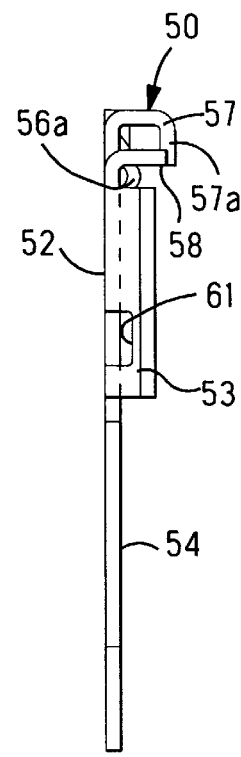

Metal supporting member 50 as shown in FIGS. 2a–2c is formed by stamping and forming from a metal sheet, and it comprises a main body 52 having a central rectangular opening 51, a support member 53 extending rearward from the main body 52, a hook member 54 extending below the main body 52, a beam 55 extending along a rear lateral edge of the main body 52 and projects slightly downward, an extension 56 projecting rearward from a location near an upper end of the beam 55, a rail 57 extending from an upper end of the main body 52 so as to overlap part of the extension 56, and a tab 58 located forward of the rail 57.

As shown, the support member 53 located to the front of the metal supporting member 50 extends slightly inwardly relative to of the main body 52. The support member 53 includes a slot 61 that accommodates projection 41 of the plate member 40 as shown in FIG. 1. Another metal supporting member 50a at the other end of connector 21 accommodates another projection 41 of plate member 40. The rail 57, which has a generally U-shaped cross section, the tab 58, the hook member 54, and the extension 56 serve to fixedly mount the metal supporting member 50 to the housing 16 of the connector 21, and the beam 55, which extends in the height direction, provides a stop means for stopping forward movement of the ejection member 90, which pivots relative to the connector 21 as discussed below. The attachment of the supporting member 50 to the housing 16 and the stopping action of the beam 55 will now be described in further detail.

First, the mounting and fixing of the metal supporting member 50 will be described through reference to both FIG. 2 and FIG. 3. In the first step in the attachment of the metal supporting member 50, an outer leg 57a of the rail 57 is disposed in a groove 35 provided in the vicinity of an end of the housing 16. At this point the tab 58 engages a front wall 36 of the housing 16 at an outer position of the groove 35, and a protrusion 56a (see FIG. 2a) provided by the extension 56 engages projection 37 located in front of the groove 35. This results in the metal supporting member 50 being properly placed at the specified position with respect to the housing 16. After this, as the second step, the hook member 54 is bent inwardly at an approximate right angle at the bottom of the housing 16 in order to secure the metal supporting member 50 onto the housing 16. At this point, mutually orthogonal first and second shoulders 59a, 59b of the hook member 54 (see FIG. 2b) engage a protrusion 28 on the bottom of the housing 16, thereby securing the metal supporting member 50 onto the housing 16.

Figure 3B:
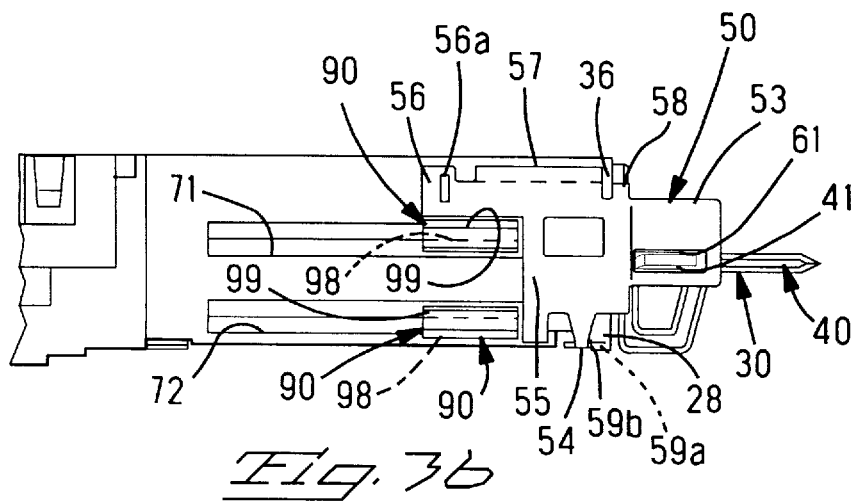

The completed attachment state of the metal supporting member 50 on the housing 16 is shown in FIG. 3b, but in particular it should be noted that when the metal supporting member 50 is mounted and fixed to the housing 16 as shown in FIG. 3b, the beam 55 is disposed such that it traverses a pair of slots 71, 72 along which outer ends of the ejection members 90 can move.

The ejection member 90 includes a necked-down section 98 that protrudes from a side of the connector housing 16 at the outer end thereof, and an operating section 99 offset to the outside thereof. An eject-operating member (not shown) is mounted to the operating section 99, and an action force allowing the ejection member 90 to pivot can be provided by operation of the eject-operating member. The necked-down sections 98 of the pair of ejection members 90 are able to move along the respective slots 71, 72 of the housing 16 when the ejection members pivotably move relative to the housing 16 to eject the cards from the card-holding members 11. Before the mounting of the metal support member 50, the slots 71, 72 open to the rear. Therefore, attaching the metal supporting member 50 to the connector unit 15 after the assembly of the ejection members 90 makes possible relatively easy attachment of the eject-operating members to the ejection members while imparting a relatively high degree of freedom to the ejection members 90.

After the metal supporting member 50 has been mounted onto housing 16, however, the beam 55 stops the forward movement of the ejection members 90. The pivoting of the ejection members 90 is therefore stopped by the beam 55, and there is no danger of the ejection members 90 damaging the housing even if an excessive action force should be applied thereto. The first advantage of this structure is that the stop means comprises a metal member which is provided where the force acts. Therefore, even when a relatively large force is applied, the metal supporting member receives this force, so that an excessive moment of force that would damage the housing is not applied to the housing, and the stop means can also be provided relatively compactly. The second advantage is that by providing the stop means to the metal supporting member 50, whereby they double as the FPC support means, the required number of parts can be kept to a minimum, and assembly thereof is also easier. In regard to the first advantage, the metal supporting member 50 is maintained securely on the housing 16 against the stopping force applied thereto by the ejection members by the presence of the extension 56 in particular.

A card connector that is a preferred embodiment of the present invention has been described, but this is nothing more than an example, and does not serve to limit the present invention.

The card connector of the present invention comprises a metal supporting member fixed to a connector unit, to which a pivot action force by an ejection member for card ejection is applied; therefore, even if an excessive action force should be applied to the ejection member, despite its being relatively small, the ejection member can be stopped against this force and the ejection member can be prevented from damaging the housing. Specifically, the housing can be made more compact than conventional card connectors, with no danger of the housing being damaged by the moment of force applied to the ejection member.

What is claimed is:

1. A card connector having a connector unit for holding a card, comprising:

a connector housing having electrical contacts secured therein for electrical connection to the card when the card is inserted into the connector unit;

an ejector mechanism having an ejection member pivotally mounted onto the connector housing for pivotal movement relative thereto during ejection of the card from the card connector by the ejector mechanism; and supporting members having support projections on which a plate member sandwiched between flexible printed circuits is mounted, the supporting members mounted onto each end of the connector housing, at least one of the supporting members including stop means against which the ejection member engages thereby stopping pivotal movement of the ejection member when a card ejection force is applied to the ejector member to prevent damage to the connector housing.

2. The card connector as claimed in claim 1, wherein the at least one of the supporting members includes a main body having a beam extending along a rear edge defining the stop means.

3. The card connector as claimed in claim 2, wherein the main body includes a U-shaped rail at one end thereof, an outer leg of the U-shaped rail being disposed in a groove of the connector housing, and a hook member extends downwardly from the main body and has a portion bent inwardly in engagement with a bottom surface of the connector housing thereby fixedly mounting the at least one of the supporting members onto the connector housing.

4. A card connector as claimed in claim 1, wherein the ejection member has a relatively thinner necked-down section extending outwardly from the connector housing that engages the stop means.

5. A card connector having a connector unit for holding a card, comprising:

a connector housing having electrical contacts secured therein for electrical connection to the card when the card is inserted into the connection unit;

an ejector mechanism having an ejection member pivotally mounted onto the connector housing for pivotal movement relative thereto during ejection of the card from the card connector by the ejector mechanism; and a supporting member having a main body with a U-shaped rail at one end thereof, an outer leg of the U-shaped rail being disposed in a groove of the connector housing, and a hook member extending donwwardly from the main body having a portion bent inwardly in engagement with a bottom surface of the connector housing thereby fixedly mounting the supporting member onto the connector housing, the supporting member having a beam extending along a rear edge which engages the election member, thereby stopping pivotal movement of the ejection member when a card ejection force is applied to the ejector member to prevent damage to the connector housing.

6. The card connector as claimed in claim 5, wherein a second supporting member is mounted onto the connector housing, the supporting members having support projections on which a plate member is mounted, the plate member being sandwiched between flexible printed circuits.

* * * * *